(12) United States Patent
Im (10) Patent No.: US 8,464,979 B2
(45) Date of Patent: Jun. 18, 2013

(54) FOLDABLE SWAN-WINGS AIRCRAFT

(76) Inventor: Sunstar Im, Lancaster, CA (US)

(*) Notice: Subject to any disclaimer, the term of this patent is extended or adjusted under 35 U.S.C. 154(b) by 415 days.

(21) Appl. No.: 12/455,473

(22) Filed: Jun. 2, 2009

(65) Prior Publication Data

US 2011/0000999 A1    Jan. 6, 2011

(51) Int. Cl.
*B64C 3/00* (2006.01)
*B64C 37/00* (2006.01)

(52) U.S. Cl.
USPC ................................ 244/45 R; 244/13; 244/2

(58) Field of Classification Search
USPC ............... 244/36, 2, 13, 24 R, 35 R, 39, 45 R
See application file for complete search history.

(56) References Cited

U.S. PATENT DOCUMENTS

| | | | | |
|---|---|---|---|---|
| 1,980,246 A | * | 11/1934 | Austin | 244/36 |
| 2,681,773 A | * | 6/1954 | Rethorst | 244/2 |
| 3,029,042 A | * | 4/1962 | Martin | 244/2 |
| 4,365,773 A | * | 12/1982 | Wolkovitch | 244/45 R |
| 5,520,355 A | * | 5/1996 | Jones | 244/13 |
| 5,810,284 A | * | 9/1998 | Hibbs et al. | 244/13 |
| 5,899,410 A | * | 5/1999 | Garrett | 244/45 R |

* cited by examiner

*Primary Examiner* — Timothy D Collins
*Assistant Examiner* — Brian M O'Hara (57) ABSTRACT

An aircraft structure is provide, an aircraft structure for an aircraft. including front Wing and rear wing of the Swan-Wing, vertical winglets and the first level Floor body. the fuselage has a cross-section of substantially flat fuselage shape being is Wide enough to provide lifting force. the front wing of the Swan-Wing are Disposed horizontally in front portion of the fuselage. rear wings of the Swan-Wing are disposed horizontally in rear portion of the fuselage. the vertical winglets Are disposed at the top of the rear fuselage. the first level disposed fuel tank storages, a Plurality of landing gear bays, cockpit with control panels, various avionics and Cabin doors.

The top of the rear fuselage disposed jet power plants, the fuselage provide lifting force And the wings provides steering force and lifting force the whole structure of an aircraft Comprises carbon fiber honey comb composite molded structure which lighter weight And shear strong structure. the cockpit and cabin disposed. front window, rear Window, side window and doors. under the belly of the Swan-Wing disposed Pontoons.

1 Claim, 8 Drawing Sheets

FOLDABLE SWAN-WINGS AIRCRAFT

BACK GROUND OF THE INVENTION

The present invention is related to a foldable Swan-Wing aircraft structure. this invention Is relates to an aircraft structure, which includes a flat wide body fuselage structure. the Wide body fuselage structure carries passengers and loads.

The wings are where the aircraft gets lifting force. specifically, home Based personal aircraft are hard to operate in the twenty first century. in the next modern Society there will need to be an advanced reliable transportation aircraft system That is quick, easy and economic for our daily living system.

Traveling time from home to work should be reduced as well as the traffic on The road in the city and highways.

The Present invention has solved part of the problem. A Foldable Swan-Wing Aircraft would be one of the best solutions for the future of transportation. The foldable Swan-Wing aircraft can be parked in a home garage and is able to carried By the trailer-car to the airport.

So you can fly to your work-place and back home to your garage.

The foldable Swan-Wing structure is comprise end of the front wings of the Swan-Wing then outward where it is extended and connected to the end of The rear wings of the Swan-Wing structure.

The Swan-Wing is shaped like a bird and becomes a one wing body.

The Swan-Wing is can be foldable when traveling on the road by a trailer And parking in a home garage. furthermore, jet power plant is comprise at the Top of the rear fuselage structure. the foldable Swan-Wing with a flat fuselage body Structure within the aircraft. It is the evolution of the new wing design of the Technology in twenty first century.

PRIOR ARTS INCLUDED U.S. PATENTS

| Number | Title | Inventor | Date issued |
|---|---|---|---|
| 1, D292393 | Airplane | Rutan, Elbert L | Oct. 20, 1987 |
| 2, 4161300 | Canard type aircraft | Schwarzler, et al | Jul. 17, 1979 |
| 3, 4292757 | Collapsible wing aircraft | Cahen Jr | Oct. 06, 1981 |
| 4, 4365773 | Joined wing aircraft | Wolkovtch | Dec. 28, 1982 |
| 5, 4417708 | Interchangeable wing aircraft | Negri | Nov. 29, 1983 |
| 6, 4641800 | Tandem or multi-winged high Performance aircraft | Rutan, Elbert L | Feb. 10, 1987 |
| 7, 5201479 | Self monitoring latch pin lock For folding wing aircraft | Renzelmann | Apr. 13, 1993 |
| 8, 5454530 | Canard rotor/wing | Rutheford, et al | Oct. 03, 1995 |
| 9, 5882204 | All wing aircraft | Croston | Jan. 21, 1992 588220 |
| 10, 5909858 | Spanwise transition section for Blended wing-body aircraft | Hawley | Jun. 08, 1999 |
| 11, 6568632 | Variable size blended wing Body aircraft | Page, et al | May 27, 2003 |
| 12, 6708924 | Variable size blended wing Body aircraft | Page, et al | Mar. 23, 2004 |

To accomplish many objectives which were not possible, it is necessary to break the Established ideas about the fuselage and the foldable Swan-Wing.

This invention is directed to solve transportation problems and satisfy the long felt need For the change.

SUMMARY OF THE INVENTION

The present invention contrives to solve the disadvantages of the prior art. The objective Of the invention is to provide an aircraft structure.

Another objective of the invention is to provide an aircraft structure which includes flat fuselage and wide body fuselage.

Still another objective of the invention is to provide an aircraft structure which includes The foldable Swan-Wing structure which comprises carbon fiber honey comb Composite molded structure which is anchored to the lower fuselage structure of the Body then anchored by the latch hinged locking mechanism. It is then connected to the Locking system that provides the foldable Swan-Wing system.

An aspect of the invention provides an aircraft structure, the aircraft structure for an Aircraft is comprises right side of Swan-Wing and left side of the Swan-Wing of The center fuselage structure.

Still another objective of the invention is to provide an aircraft, which includes fuel tank Storage.

The fuselage is wide enough to provide lifting force.

The right side foldable Swan-Wing is disposed horizontally on the right side Portion of the fuselage and are configured to provide lifting force and to control flight of The Aircraft.

The Left side foldable Swan-Wing are disposed horizontally on the left side portion Of the fuselage and are configured to provide lifting force and to control flight of the Aircraft.

The two vertical winglets are disposed at the top of the fuselage with stabilizer.

The first level of fuselage is comprises cockpit and a plurality of passenger cabins.

The center portion of the fuselage is comprises jet-power plants to provide air power for The aircraft. the passenger cabin is may further comprise a seating systems on Passenger cabin is and may further comprise a plurality of door.

The aircraft structure is may further comprise each of the two front wings has an elevators.

Each of the two front portion wings of the Swan-Wing is may have cross Sectional shape of lamina flow, each of two front wings and two rear wings of the Swan-Wing is may comprises plurality of the carbon fiber honey comb composite molded Structure wing body.

The front landing gear bays is may further comprise front portion of the bottom of The fuselage and the plurality of rear landing gear bays maybe aligned in two parallel Lines in the bottom of the fuselage.

Each of some of the two front wings and two rear wings of Swan-Wing is may Comprise one or more elevators.

Each of the two vertical winglets is may comprise a stabilizer.

Another aspect of the invention provides an aircraft structure for an aircraft is comprising A fuselage has a cross section of the substantially a flat fuselage shape in a direction of Width the fuselage being wide enough to provide lifting force.

Another aspect of the invention an aircraft structure wherein the fuselage is Comprise first level, an upper top surface, and a lower bottom surface.

The advantage of the present invention is;

1, An aircraft structure can provide more lift with the flat fuselage and Swan-Wing.

2, The foldable Swan-Wing of one wing structure body can provide maximum lifting Force and flexible highly maneuverable flight control of an aircraft.

3, The foldable Swan-Wing structure comprise carbon fiber honey comb composite Molded structure which lighter weight and shear strong wing structure.

4, The foldable Swan-Wing structure are much access to transportable one place to Another place by trailer car, this is a home base operating households dream in twenty First century. just like portable personal aircraft.

5, Jet-power plants provide easy lift from the airport and to fly high-speed at high Altitude airspace.

Although the present invention is briefly summarized the fuller understanding of the Drawings detailed description and appended claims.

BRIEF DESCRIPTION OF THE INVENTION

These and other features, aspects and advantages of the present invention will become Better understanding with reference to the accompanying drawings, wherein.

DETAILED DESCRIPTION EMBODIMENT OF THE INVENTION

Figure 1:
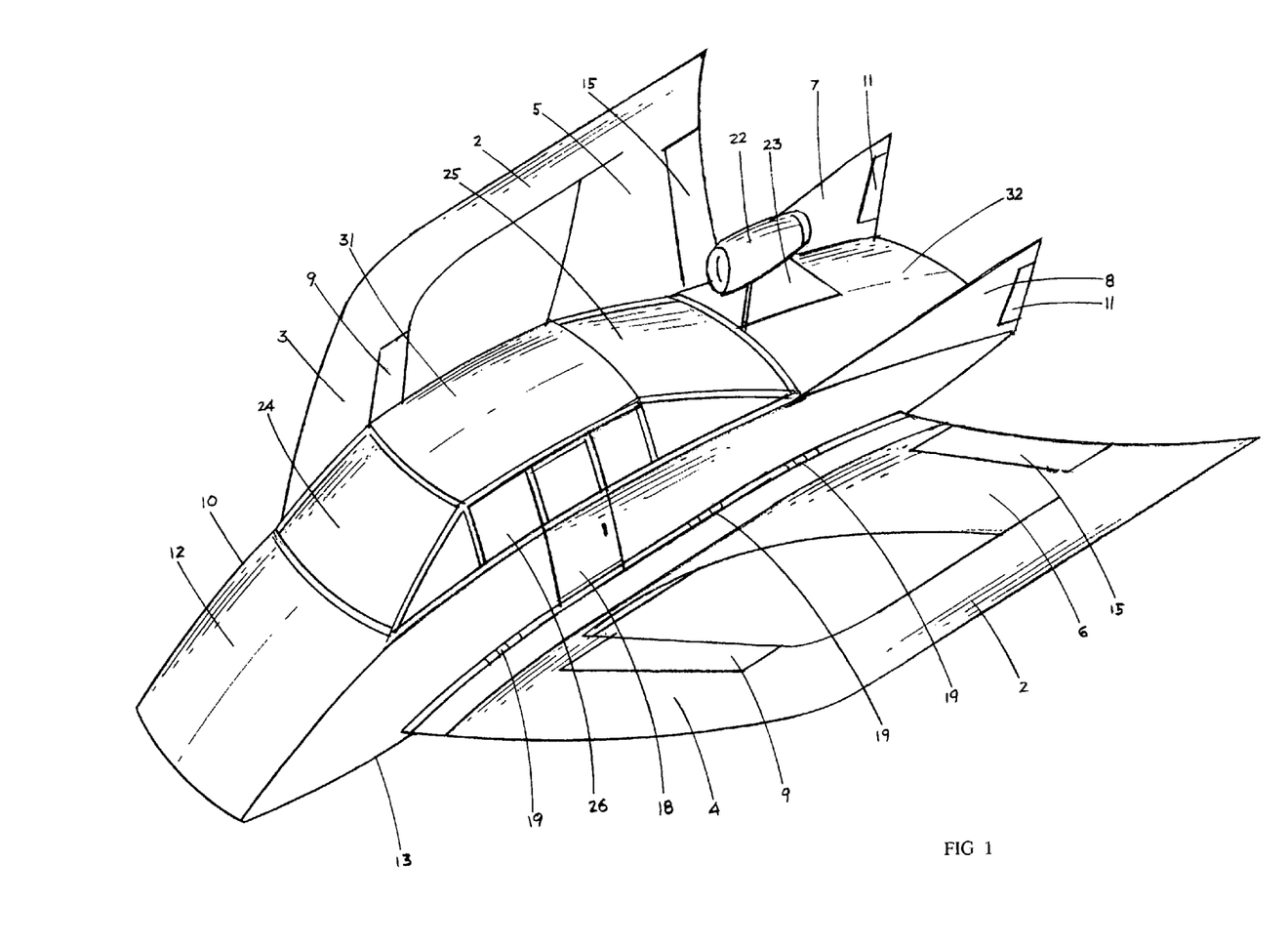
FIG. 1, is a perspective view showing an aircraft having a structure according to an Embodiment of the present invention.
Figure 5:
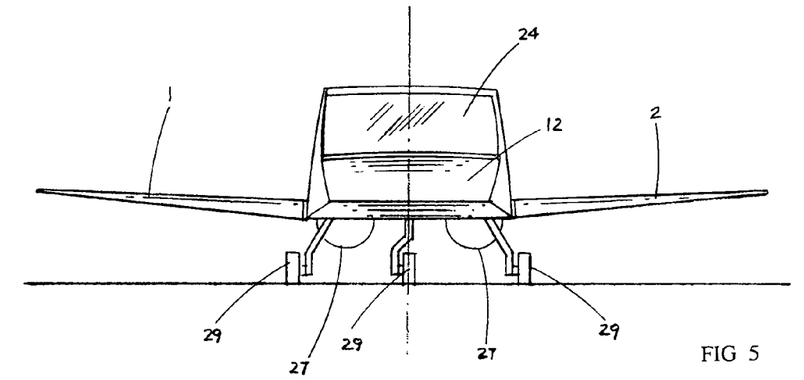
FIG. 5, is a front plan view of an aircraft of FIG. 1.
Figure 6:
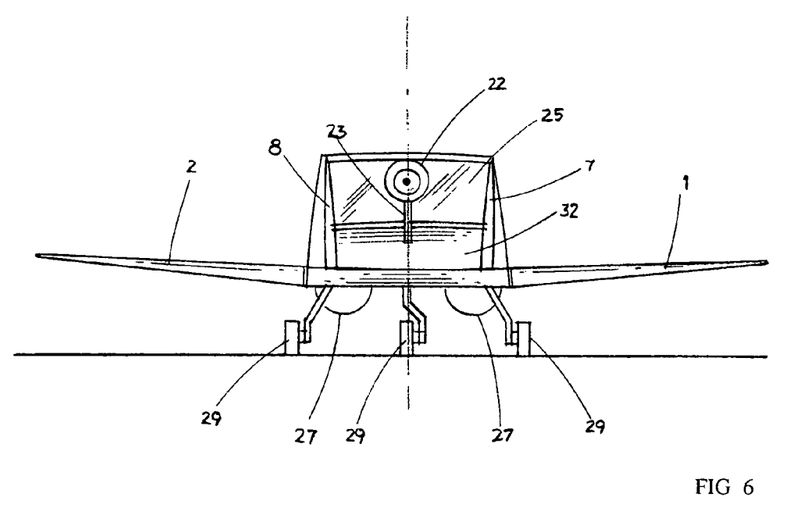
FIG. 6, is a rear plan view of an aircraft of FIG. 1.
Figure 7:
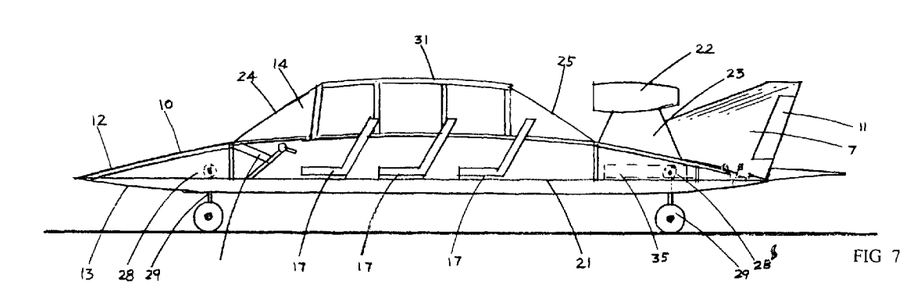
FIG. 7, is a cross section side view of an aircraft of FIG. 1.

FIG. 1,-6, shows an aircraft 100, according to an embodiment of the present invention. FIG. 7,-11, shows inner structure of an aircraft 100, an aspect of the invention provides The illustrated structure of an aircraft 100, an aircraft structure for an aircraft 100, is Comprise a fuselage 10.

An aircraft structure for an aircraft 100, is may further comprise right side Swan-Wing of the fuselage 10, and left side of Swan-Wing 2, of the fuselage 10, is May further comprise two front wings 3, 4, of the Swan-Wing, two rear wings 5, 6, of the Swan-Wing and the vertical winglets 7, 8, an aircraft structure for an aircraft 100, is may comprise, first level 21, top surface 31, bottom surface 13, front fuselage 12, rear fuselage 32, as shown in FIG. 1, 2, 3, 4.

The fuselage 10, has a cross-section of substantially flat fuselage shape in a direction of Width and the fuselage 10, is wide enough to provide lifting force.

The two front wings 3, 4, of the Swan-Wing I, 2, are disposed horizontally in front Portion of the fuselage 10, and are configured to control flight and lifting force of an Aircraft 100, the two rear wings 5, 6, of the Swan-Wing 1, 2, are disposed Horizontally in rear portions of the fuselage 10, and are configured to control flight of an Aircraft 100.

The two vertical winglets 7, 8, are disposed at top portion of the rear fuselage 32, the first Level 21, is configured to anchor the Swan-Wing 1, 2, by the hinged latch Mechanism 19, 33, the fuselage provides a major portion of the lifting force and the Swan-Wing 1, 2, provide lifting force and steering force, As shown in 1, 2, 3, 4, 5, 6, 7, 8, 9, 10, 11.

Figure 10:
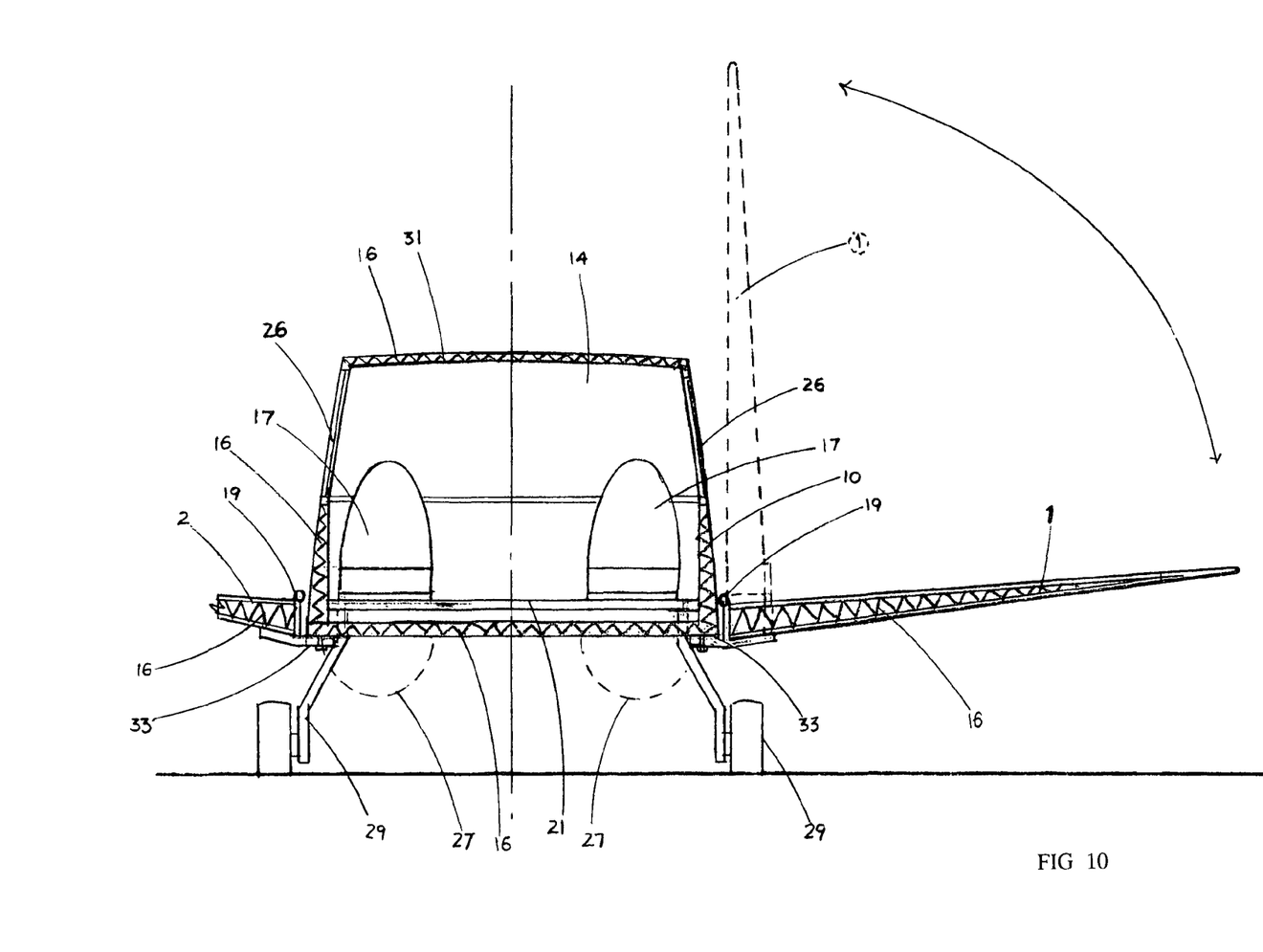
FIG. 10, is a cross sectional front view of the aircraft FIG. 9.
Figure 11:
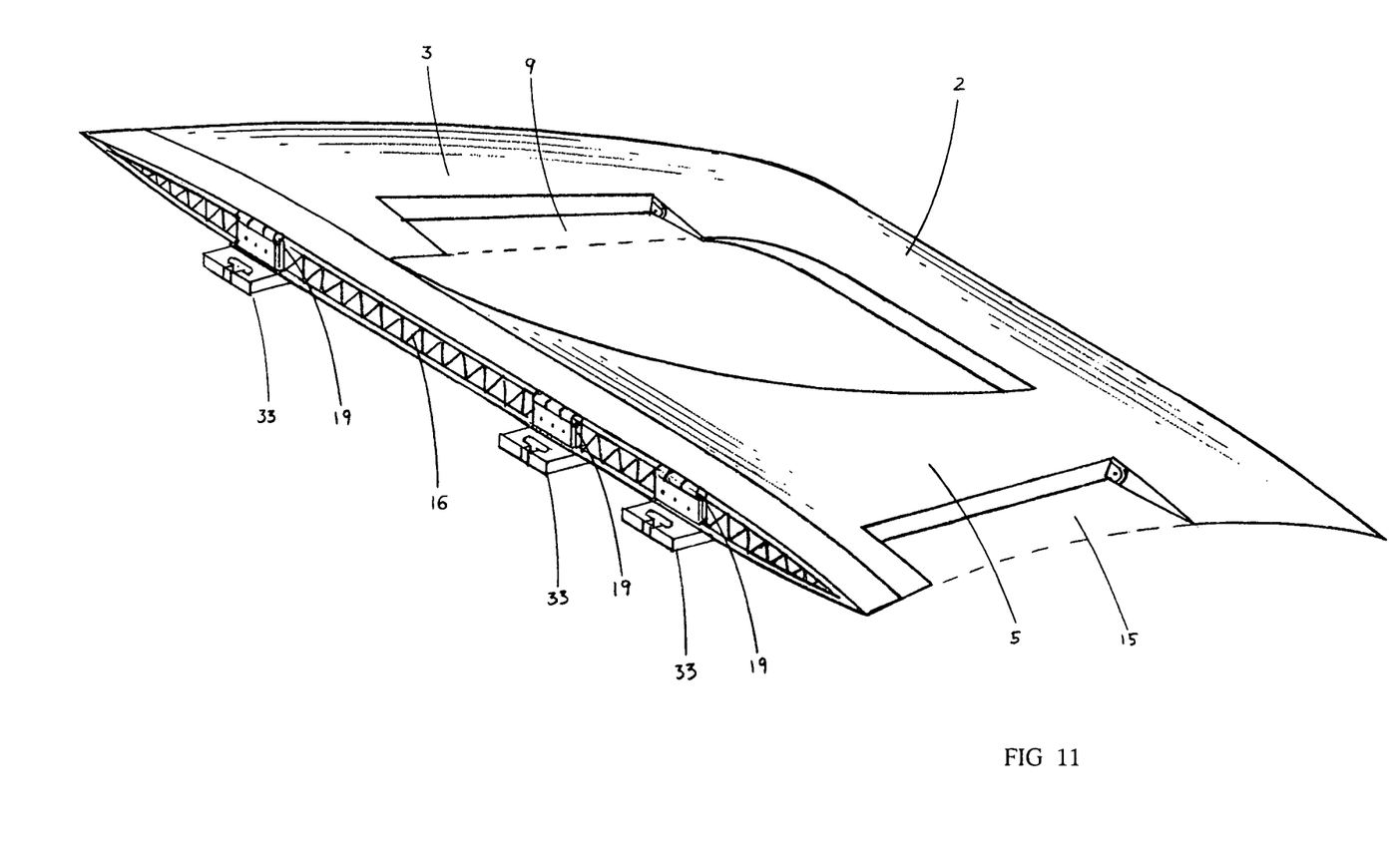
FIG. 11, is a perspective top view of right side Swan-Wing of the aircraft FIG. 4.

The fuselage 10, may float in water due to the whole structure is comprise carbon Fiber honey comb composite molded structure 16, as shown in FIG. 10, is water tight as Well as air tight, the aircraft is may be landing sea port and also comprise pontoon 27, at the belly of the Swan-Wing as shown in FIG. 5, 6, 10, the first level at cabin 14, Is may further comprise a plurality of seating 1,7, and first level at cockpit is may Further comprise a plurality of doors 18, at cabin 14, and control panel 20, avionics And control systems.

And front of window 24, rear window 25, both side windows 26, as shown in 7, 8, 10. Each of the two front wings 3, 4, is may comprise an elevator 9, as shown in FIG. 1, 2, 4, 9.

Figure 3:
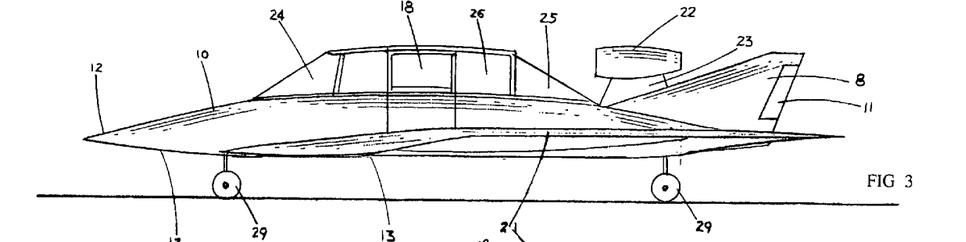
FIG. 3, is a side plan view of an aircraft of FIG. 1.
Figure 4:
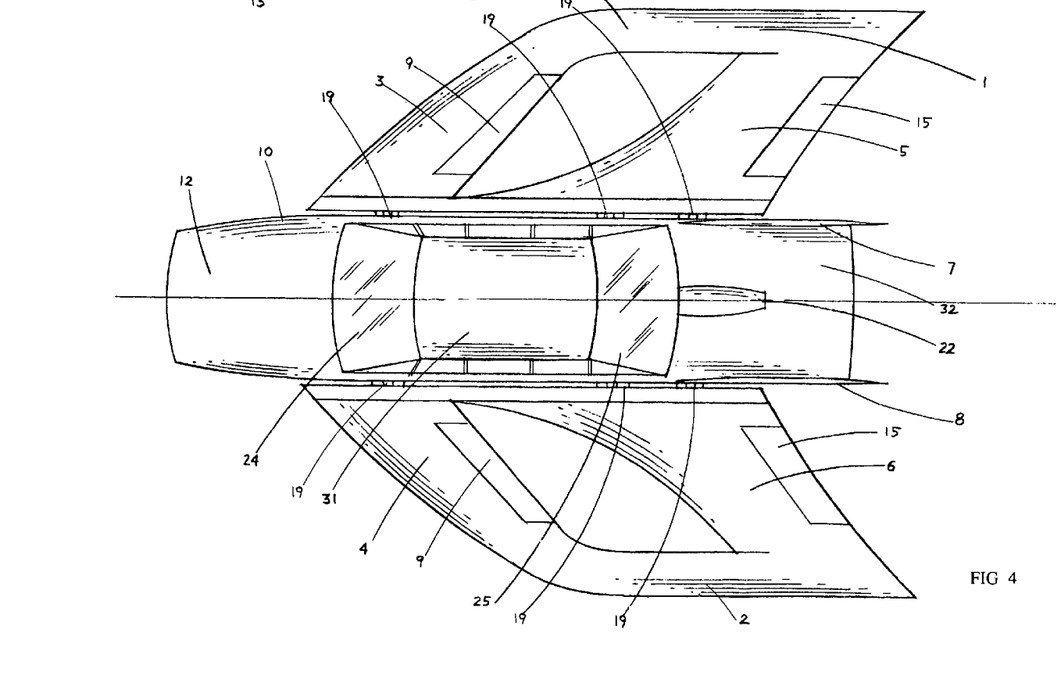
FIG. 4, is a top plan view of an aircraft of FIG. 1.

Each of the two front wings 3, 4, is may have a cross section shape of lamina flow as Shown in FIG. 3.

Figure 2:
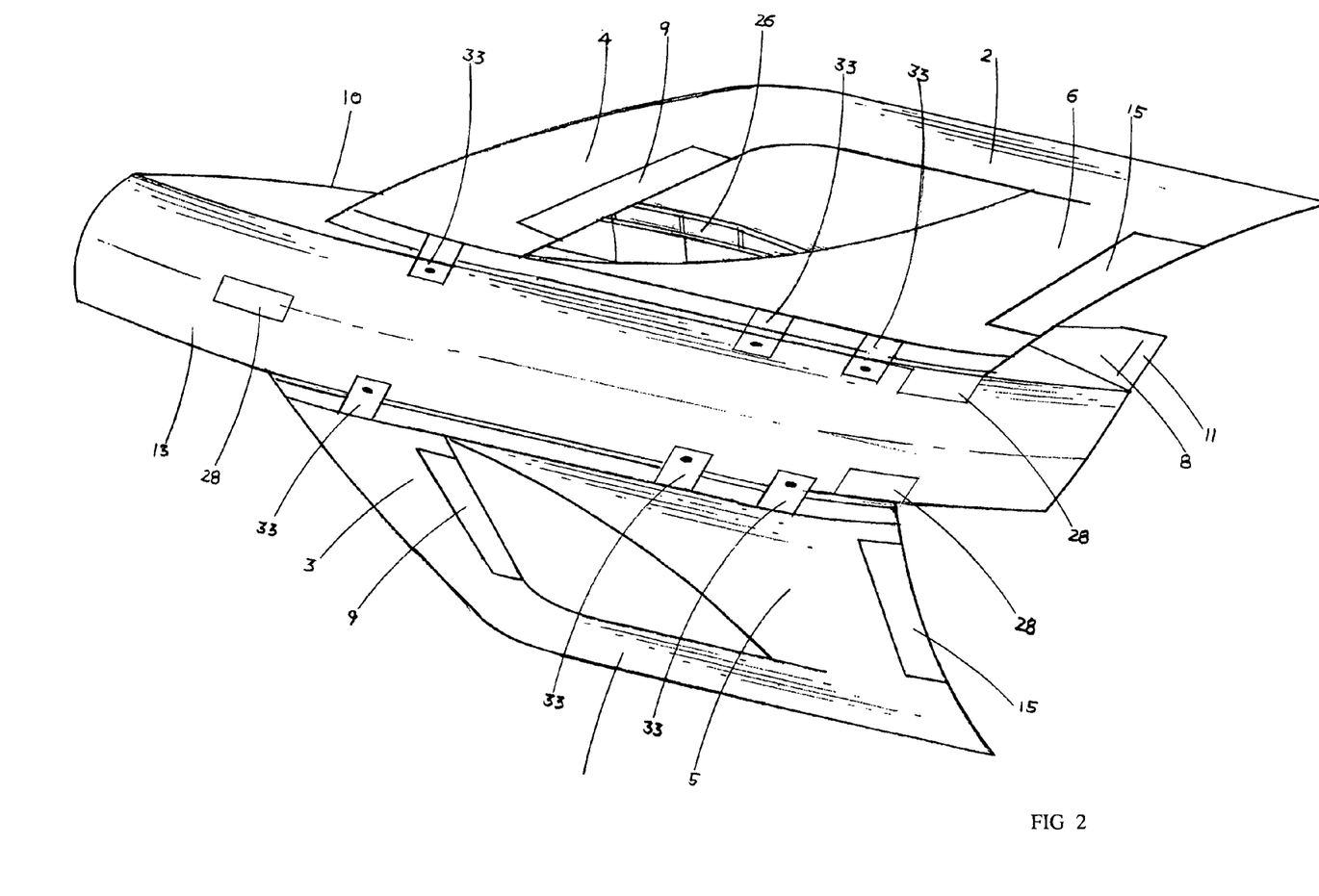
FIG. 2, is a perspective bottom view of an aircraft of FIG. 1.
Figure 8:
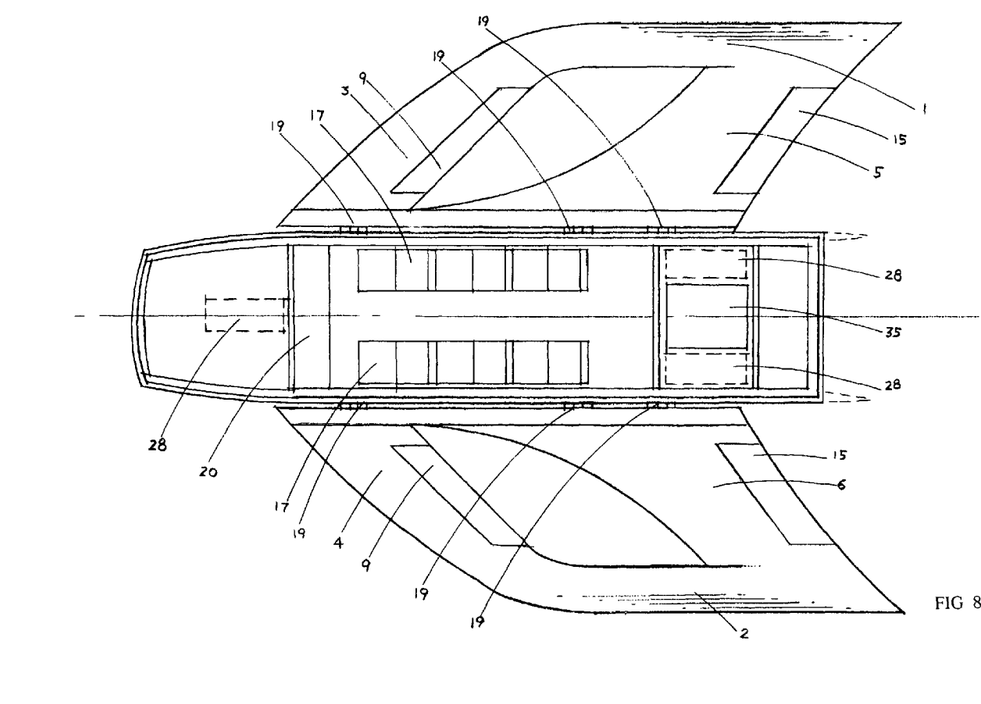
FIG. 8, is a cross section top view of an aircraft of FIG. 1.

Each of the two rear wings of the Swan-Wing 5, 6, is may comprise a Elevator 15, shown in FIG. 1, 2, 8.

Each of the two rear wings 5, 6, of the Swan-Wing is may have a cross-section 5, 6, Shape of lamina flow as shown in FIG. 3.

The air foil shape is provide with the wings 3, 4, 5, 6, the ratio of the lifting force of the Swan-Wing is maybe predetermined optimize the flight, each of the two Swan-Wing is may comprise a plurality of carbon fiber comb composite molded Structure 16, which shear strong and highly flexible maneuverable at the air space, as Shown in FIG. 10.

Each of the fuselage walls, floors, roofs, and cabin is may comprise a plurality of Carbon fiber honey comb composite molded structure 16, as shear strong and lighter Weight fuselage structure as shown in FIG. 10, First level 21, is may further comprise A fuel tank storage compartment 35, rear cabins. Each of some of the two front wings 3, 4, of the Swan-Wing and the two rear wings 5, 6, of the Swan-Wing 1, 2, is may Comprise one or more elevators 9, 15, as shown in 1, 2, 3, 4.

First level 21, is further comprise front landing gear bay at front portion of the Fuselage, rear of landing gear bays is maybe aligned in two parallel lines in the bottom of The fuselage.

Each of the two vertical winglets 7, 8, is may comprise stabilizer 11.

Another aspect of the invention provides an aircraft structure for an aircraft is may Comprise a fuselage 10, having a cross-section of substantially a flat fuselage 10, Being wide enough to provide lifting force.

Figure 9:
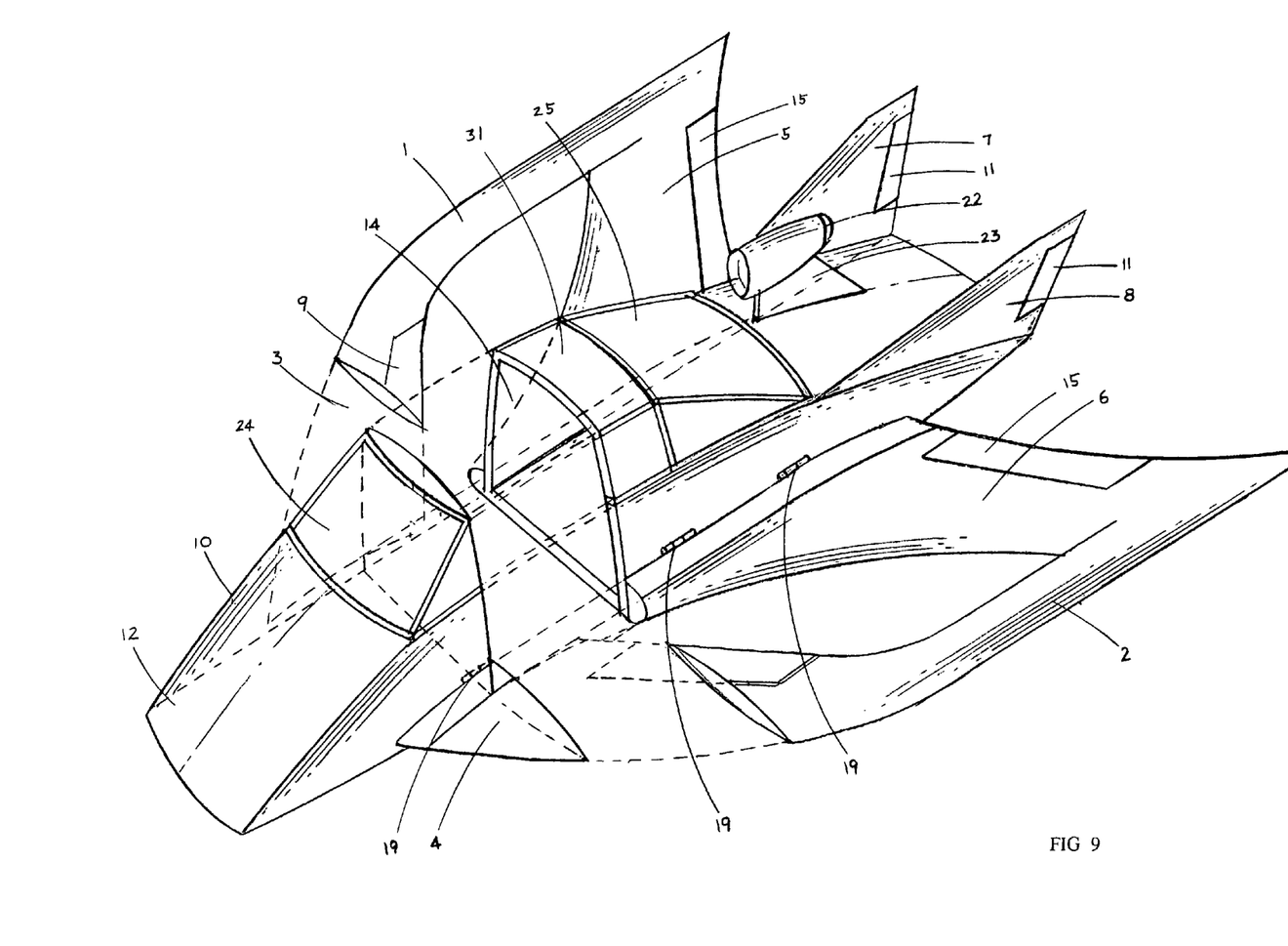
FIG. 9, is a perspective top and partial cross sectional of an aircraft according to an Embodiment of the invention.

Another aspect of the invention provides an aircraft structure for the aircraft 100, is may Comprise jet power plants 22, with supporter 23, at the top portion of the rear Fuselage 32, as shown in FIG. 1, 7, 9, for providing lifting power for the high altitude air Space and high speed space travel, as shown in 1, 3, 7, 9.

While the invention has been shown and described with reference to different Embodiment thereof, it will be appreciated by those skilled in the art that variations In form, detailed, compositions and operations may be made without departing from the Spirit and scope of the invention as defined by the accompanying claims.

THE REFERENCE OF THE PRIOR ARTS

Prior Arts Included U.S. Patents

| Number | Title | Inventor | Date issued |
|---|---|---|---|
| 1, D292393 | Airplane | Rutan, Elbert L | Oct. 20, 1987 |
| 2, 4161300 | Canard type aircraft | Schwarzler, et al | Jul. 17, 1979 |
| 3, 4292757 | Collapsible wing aircraft | Cahen Jr | Oct. 06, 1981 |
| 4, 4365773 | Joined wing aircraft | Wolkovtch | Dec. 28, 1982 |
| 5, 4417708 | Interchangeable wing aircraft | Negri | Nov. 29, 1983 |
| 6, 4641800 | Tandem or multi-winged high Performance aircraft | Rutan, Elbert L | Feb. 10, 1987 |
| 7, 5201479 | Self monitoring latch pin lock For folding wing aircraft | Renzelmann | Apr. 13, 1993 |
| 8, 5454530 | Canard rotor/wing | Rutheford, et al | Oct. 03, 1995 |
| 9, 5882204 | All wing aircraft | Croston | Jan. 21, 1992 588220 |
| 10, 5909858 | Spanwise transition section for Blended wing-body aircraft | Hawley | Jun. 08, 1999 |
| 11, 6568632 | Variable size blended wing Body aircraft | Page, et al | May 27, 2003 |
| 12, 6708924 | Variable size blended wing Body aircraft | Page, et al | Mar. 23, 2004 |

What is claimed is:

1. A swan-wing aircraft comprising:
a fuselage having a substantially flat bottom and a cross section having a shape for providing lift;
a plurality of hinged-latch mechanisms, at least one hinged-latch mechanism attached to each of a left and a right side of the fuselage and having an axis which is parallel to a longitudinal axis of the aircraft;
two wings, each wing being foldable about the hinged-latch mechanism from a horizontal position to a vertical position;
each wing having a swept back forward lifting portion, a swept back rear lifting portion which is larger than the forward lifting portion, and an outboard portion;
wherein said forward lifting portion is connected to said rear lifting portion by said outboard portion, the outboard portion extending from a distal tip of the forward lifting portion to a distal tip of the rear lifting portion to form a wing body structure that lays in a single plane and includes an opening extending from a top of the wing body structure to a bottom thereof;
wherein the forward lifting portion includes a first control surface at a rear of said forward lifting portion and the rear lifting portion includes a second control surface at a rear of said rear lifting portion; and
wherein the wings form a blended lifting-body with the fuselage when the wings are in the horizontal position.

* * * * *